(12) United States Patent
Chen et al.

(10) Patent No.: US 10,412,331 B2
(45) Date of Patent: Sep. 10, 2019

(54) POWER CONSUMPTION ESTIMATION METHOD AND POWER CONSUMPTION ESTIMATION APPARATUS

(71) Applicant: INDUSTRIAL TECHNOLOGY RESEARCH INSTITUTE, Hsinchu (TW)

(72) Inventors: Chun Wei Chen, Changhua (TW); Ming-Der Shieh, Tainan (TW); Juin-Ming Lu, Hsinchu (TW); Hsun-Lun Huang, Taichung (TW); Yao-Hua Chen, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/853,549

(22) Filed: Dec. 22, 2017

(65) Prior Publication Data

US 2019/0068904 A1    Feb. 28, 2019

(30) Foreign Application Priority Data

Aug. 24, 2017   (TW) .............................. 106128834 A (51) Int. Cl.
  *H04N 5/369* (2011.01)
  *H04N 5/232* (2006.01)
(52) U.S. Cl.
  CPC ....... *H04N 5/3698* (2013.01); *H04N 5/23241* (2013.01); *G06F 2217/78* (2013.01); *G09G 2360/08* (2013.01)
(58) Field of Classification Search
  CPC ............. H04N 5/3698; H04N 5/23206; H04N 5/23219; H04N 5/23245; H04N 5/247;
  (Continued)

(56) References Cited

U.S. PATENT DOCUMENTS 6,871,409 B2   3/2005 Robb et al.
6,895,561 B2   5/2005 Blatt et al.
(Continued)

FOREIGN PATENT DOCUMENTS

CN     1726514 A    1/2006
CN   101030345 A    9/2007
(Continued)

OTHER PUBLICATIONS

Taiwanese Office Action for corresponding application No. TW 106128834, dated Jun. 4, 2018.
(Continued)

*Primary Examiner* — Pritham D Prabhakher
(74) *Attorney, Agent, or Firm* — Maschoff Brennan (57) ABSTRACT

A power consumption estimation method is applied to an image with N rows of pixels, and comprises a pixel estimation procedure comprising performing an estimation sub-procedure pixel by pixel for each of a plurality of pixels in one row of the N rows of pixels to obtain a plurality of pixel energy consumption values respectively corresponding to the plurality of pixels in said one row of the N rows, and obtaining a row power consumption value corresponding to said one row of the N rows according to the plurality of pixel energy consumption values. The estimation sub-procedure comprises obtaining pixel content information corresponding to one of the plurality of pixels, and determining the pixel energy consumption value according to the pixel content information. The pixel energy consumption value indicates pixel energy consumption generated by performing a predetermined image processing procedure for said one of the plurality of pixels.

22 Claims, 9 Drawing Sheets performing an estimation sub-procedure pixel by pixel for each of a plurality of pixels in one row of the N rows of pixels so as to obtain a plurality of pixel energy consumption values respectively corresponding to the plurality of pixels in said one row of the N rows of pixels —S101 obtaining a row power consumption value corresponding to said one row of the N rows of pixels according to the plurality of pixel energy consumption values —S103

(58) Field of Classification Search
CPC .... H04N 5/343; H04N 5/372; H04N 5/23241; G06F 2217/78; G06F 2217/80; G06F 17/5009; G06F 17/5036; G06F 17/5045; G06F 17/5081; G06F 17/5022; G06F 17/504; G06F 17/505; G06F 1/3206; G06F 1/324; G06F 1/3296; G06F 1/325; G09G 2360/08; Y02D 10/172; Y02D 10/126
USPC ........................................................ 348/372
See application file for complete search history.

(56) References Cited

U.S. PATENT DOCUMENTS

| | | | |
|---|---|---|---|
| 8,082,530 | B1 | 12/2011 | Ou et al. |
| 8,122,398 | B2 | 2/2012 | Veller et al. |
| 8,510,694 | B2 | 8/2013 | Hsieh et al. |
| 8,902,132 | B2 | 12/2014 | Ozawa et al. |
| 9,728,159 | B2 | 8/2017 | Daly et al. |
| 9,830,870 | B2 * | 11/2017 | Chen ................ G09G 3/3611 |
| 9,870,729 | B2 * | 1/2018 | Saruhashi ........... G09G 3/2003 |
| 2004/0075625 | A1 | 4/2004 | Kim |
| 2005/0093780 | A1 | 5/2005 | Jeong |
| 2006/0080076 | A1 | 4/2006 | Lahiri et al. |
| 2006/0092103 | A1 | 5/2006 | Kim |
| 2007/0139406 | A1 * | 6/2007 | Ozawa ............... G09G 3/3233 345/211 |
| 2012/0144216 | A1 | 6/2012 | Hsieh et al. |
| 2013/0124885 | A1 | 5/2013 | Davis et al. |
| 2014/0107999 | A1 | 4/2014 | Frenkil |
| 2014/0368708 | A1 | 12/2014 | Seo et al. |
| 2015/0029210 | A1 * | 1/2015 | Daly ................... G09G 5/02 345/591 |
| 2015/0067634 | A1 | 3/2015 | Huilgol |
| 2015/0095010 | A1 | 4/2015 | Brock et al. |
| 2015/0172539 | A1 | 6/2015 | Neglur |
| 2016/0329009 | A1 * | 11/2016 | Chen ................ G09G 3/3611 |
| 2017/0103693 | A1 * | 4/2017 | Saruhashi ........... G09G 3/2003 |
| 2017/0178572 | A1 * | 6/2017 | Ma ................... G09G 3/3225 |

FOREIGN PATENT DOCUMENTS

| | | |
|---|---|---|
| CN | 103971134 A | 8/2014 |
| CN | 106791219 A | 5/2017 |
| TW | I270003 A | 7/2006 |
| TW | 201126419 A | 8/2011 |
| WO | 2013/142067 A1 | 9/2013 |

OTHER PUBLICATIONS

Chandoke, N., & Sharma, A. K. (Dec. 2015). A novel approach to estimate power consumption using SystemC transaction level modelling. In India Conference (INDICON), 2015 Annual IEEE (pp. 1-6). IEEE.

Ahuja, S., Mathaikutty, D. A., Singh, G., Stetzer, J., Shukla, S. K., & Dingankar, A. (Mar. 2009). Power estimation methodology for a high-level synthesis framework. In Quality of Electronic Design, 2009. ISQED 2009. Quality Electronic Design (pp. 541-546). IEEE.

Lebreton, H., & Vivet, P. (Apr. 2008). Power modeling in SystemC at transaction level, application to a DVFS architecture. In Symposium on VLSI, 2008. ISVLSI'08. IEEE Computer Society Annual (pp. 463-466). IEEE.

Mbarek, O., Pegatoquet, A., Auguin, M., & Fathallah, H. E. (Jan. 2013). Power-aware wrappers for transaction-level virtual prototypes: A black box based approach. In VLSI Design and 2013 12th International Conference on Embedded Systems (VLSID), 2013 26th International Conference on (pp. 239-244). IEEE.

Lee, I., Kim, H., Yang, P., Yoo, S., Chung, E. Y., Choi, K. M., . . . & Eo, S. K. (Jan. 2006). PowerV i P: Soc power estimation framework at transaction level. In Proceedings of the 2006 Asia and South Pacific Design Automation Conference (pp. 551-558). IEEE Press.

Atitallah, R. B., Niar, S., & Dekeyser, J. L. (Dec. 2007). MPSoC power estimation framework at transaction level modeling. In Microelectronics, 2007. ICM 2007. Internatonal Conference on (pp. 245-248). IEEE.

* cited by examiner

FIG. 14

POWER CONSUMPTION ESTIMATION METHOD AND POWER CONSUMPTION ESTIMATION APPARATUS

CROSS-REFERENCE TO RELATED APPLICATIONS

This non-provisional application claims priority under 35 U.S.C. § 119(a) on Patent Application No(s). 106128834 filed in Taiwan, R.O.C. on Aug. 24, 2017, the entire contents of which are hereby incorporated by reference.

BACKGROUND

Technical Field

This disclosure relates to a power consumption estimation method and a power consumption estimation apparatus.

Related Art

The simulation analysis for electronic system level (ESL) is gradually applied to the early development stage and the performance estimation of hardware and software. The power consumption estimation for ESL still has considerable room for improvement. Most semiconductor manufacturers usually recommend estimating the power consumption for ESL with some common specifications. Due to the expensive development process, most silicon intellectual property (SIP) providers do not actually provide the power consumption model for ESL. Therefore, the existing power consumption model for ESL is just able to roughly estimate the power consumption from hardware architecture. However, this kind of power consumption model does not involve the content of an input signal.

Regarding an image processing circuit as an example, the power consumption of the image processing circuit is related to not only the hardware configuration but also the image content to be processed. Therefore, the differences in the power consumption for processing different image contents are difficult to be perceived when the power estimation is performed only based on the hardware configuration. Furthermore, the actual power consumption of the image processing circuit cannot be appropriately shown.

SUMMARY

According to one or more embodiments of this disclosure, a power consumption estimation method is applied to an image with N rows of pixels. The power consumption estimation method comprises a pixel estimation procedure comprising: performing an estimation sub-procedure pixel by pixel for each of a plurality of pixels in one row of the N rows of pixels so as to obtain a plurality of pixel energy consumption values respectively corresponding to the plurality of pixels in said one row of the N rows of pixels; and obtaining a row power consumption value corresponding to said one row of the N rows of pixels according to the plurality of pixel energy consumption values; wherein the estimation sub-procedure comprises: obtaining pixel content information corresponding to one of the plurality of pixels; and determining the pixel energy consumption value according to the pixel content information, with the pixel energy consumption value indicating pixel energy consumption generated by performing a predetermined image processing procedure for said one of the plurality of pixels.

According to one or more embodiments of this disclosure, a power consumption estimation apparatus comprises a memory and a processor which are electrically connected to each other. The memory is configured to store a plurality of instructions. The processor is configured to perform one or more of the plurality of instructions. When the processor performs said one or more of the plurality of instructions, the power consumption estimation apparatus is configured to perform the power consumption estimation method.

According to one or more embodiments of this disclosure, another power consumption apparatus comprises a conversion circuit, an energy consumption estimation circuit and a calculation circuit. The conversion circuit is configured to obtain a retrieval signal according to pixel content information, with the retrieval signal configured to indicate a type of a current operating pixel, wherein the current operating pixel is considered one of a plurality of pixels of an image, and the plurality of pixels are arranged in N rows. The energy consumption estimation circuit is electrically connected to the conversion circuit, and configured to provide a pixel energy consumption value corresponding to the current operating pixel according to the retrieval signal. The calculation circuit is electrically connected to the energy consumption estimation circuit, and configured to accumulate the energy consumption value provided by the energy consumption estimation circuit to obtain a row power consumption value of one of the N rows which comprising the current operating pixel.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The power consumption estimation method provided in the disclosure is applied to an image having N rows of pixels. The power consumption estimation method comprises a pixel estimation procedure, and this power consumption estimation could further comprise a hardware state estimation procedure. When the power consumption estimation method comprises the pixel estimation procedure and the hardware state estimation procedure, the power consumption estimation method could determine whether power consumption estimation is performed by the pixel estimation procedure or the hardware state estimation procedure according to a configuration setting. In the following, the situation that the power consumption estimation method comprises the pixel estimation procedure is firstly explained.

Figure 1:
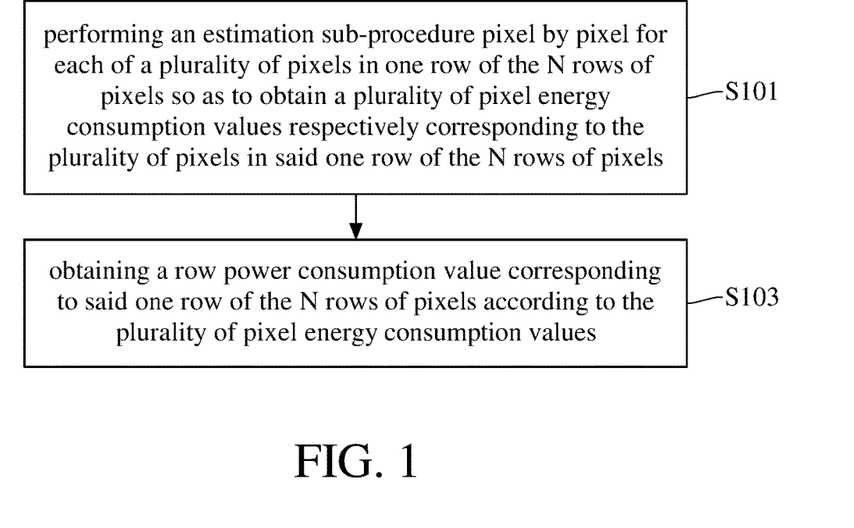
FIG. 1 is a flow chart of a power consumption estimation method according to an embodiment of the disclosure.
Figure 2:
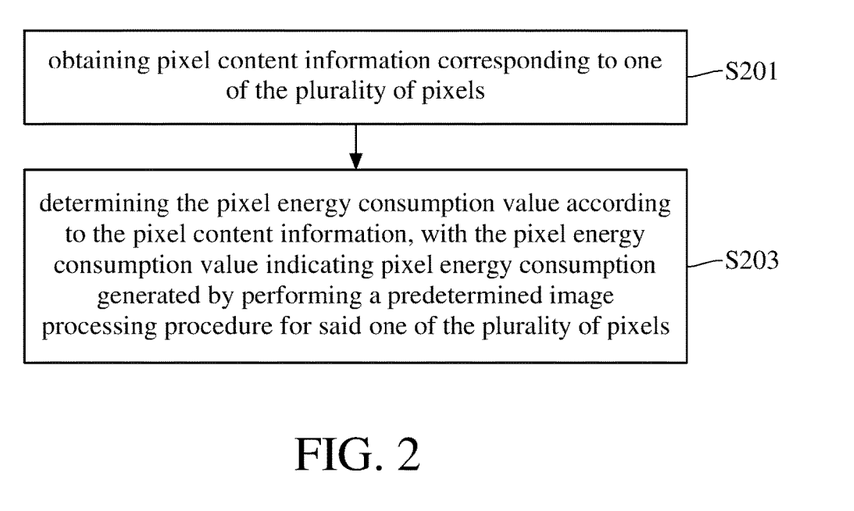
FIG. 2 is a flow chart of an estimation sub-procedure of a power consumption estimation method according to an embodiment of the disclosure.

Please refer to FIG. 1 and FIG. 2. FIG. 1 is a flow chart of a power consumption estimation method performing under a pixel estimation procedure according to an embodiment of the disclosure, and FIG. 2 is a flow chart of an estimation sub-procedure of a power consumption estimation method according to an embodiment of the disclosure. The pixel estimation procedure of the power consumption estimation method comprises: in step S101, the plurality of pixels of one row of N rows of pixels is performed an estimation sub-procedure pixel by pixel so that a plurality of pixel energy consumption values could be obtained. The plurality of pixel energy consumption values respectively corresponds to the plurality of pixels of said row of pixels; in step S103, a row power consumption value corresponding to said row of pixels is obtained according to the plurality of pixel energy consumption values. On the other hand, FIG. 2 illustrates the related steps of the estimation sub-procedure. As shown in FIG. 2, in step S201 of the estimation sub-procedure, pixel content information corresponding to one of the plurality of pixels is obtained, and in step S203 of the estimation sub-procedure, the pixel energy consumption value corresponding to said one of the plurality of pixels is determined according to the pixel content information wherein the pixel energy consumption value indicates the energy consumption generated when a predetermined image processing procedure is performed for said one of the plurality of pixels.

Figure 3:
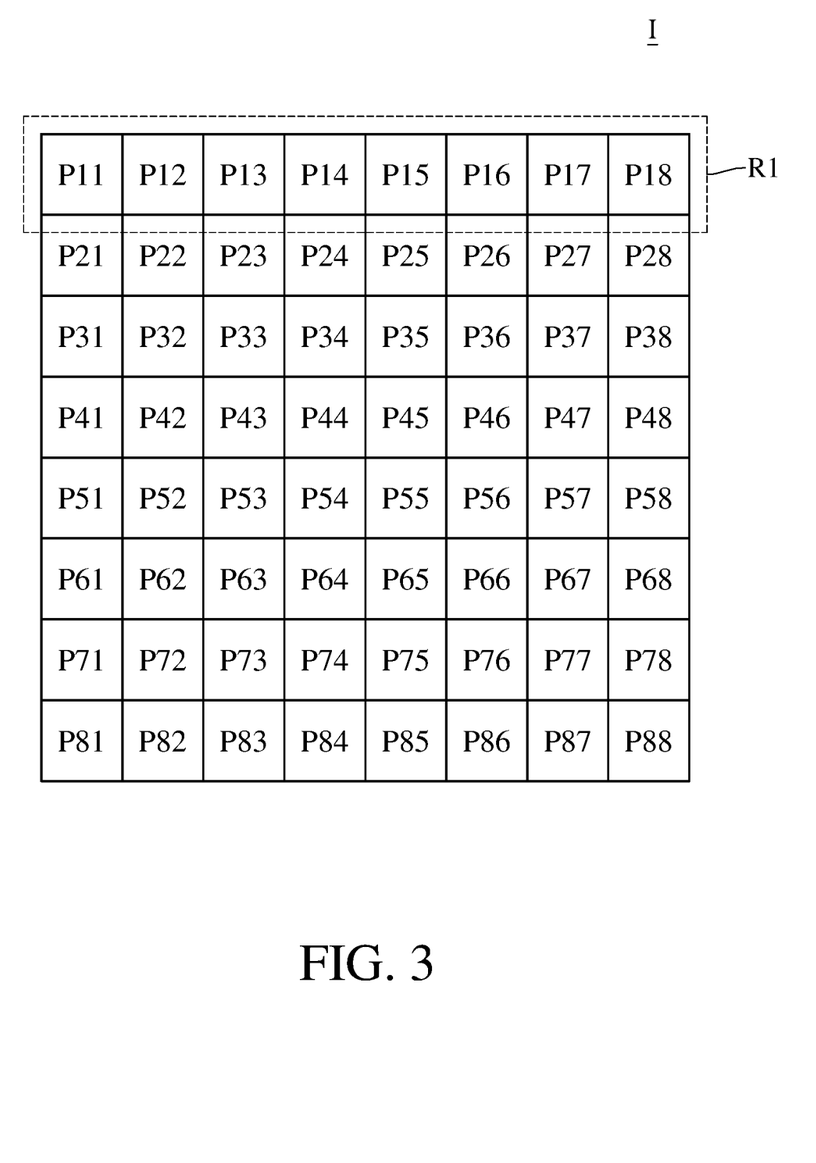
FIG. 3 is an arrangement diagram of pixels of an image according to an embodiment of the disclosure.

Please refer to FIG. 3 for more specific explanation. FIG. 3 is an arrangement diagram of pixels of an image according to an embodiment of the disclosure. In this embodiment, the aforementioned estimation sub-procedure is performed for each pixel of image I in accordance with an order such as the order of pixel P11, pixel P12 and pixel P18. For example, the estimation sub-procedure is related to an image signal processor (ISP). For the pixel P11, the estimation sub-procedure is performed by obtaining the pixel content information of the pixel P11, and then determining the energy consumption generated by performing the predetermined image processing procedure for the pixel P11. The value of the above energy consumption is considered to be the pixel energy consumption value. For example, the pixel content information indicates raw raster data, and the predetermined image processing procedure comprises one or more of black clamping, lens distortion compensation, fault pixel correction, auto white balance, and so on. The pixel content information and the predetermined image processing procedure are not limited to the above.

When the pixel energy consumption values of the pixels P11, P12 and P18 are obtained, these pixel energy consumption values are added up to obtain the row energy consumption value of the pixel row R1. Afterwards, the row energy consumption value is divided by the time so as to obtain the row power consumption value of the pixel row R1.

The aforementioned step S203 may comprise one or more steps. Please refer to FIG. 4 which is a flow chart of a power consumption estimation method according to an embodiment of the disclosure. In step S301, an absolute content parameter of the subject pixel which the estimation sub-procedure is performed for is obtained according to the pixel content information of the subject pixel. In step S303, a relative content parameter of the subject pixel is obtained according to the pixel content information of the subject pixel and the pixel content information of at least another one of the plurality of pixels. In step S305, the pixel energy consumption value of the subject pixel is determined according to the absolute content parameter and the relative content parameter of the subject pixel. As aforementioned, the pixel energy consumption value indicates the value of the energy consumption generated when the predetermined image processing procedure is performed for the subject pixel.

Figure 4:
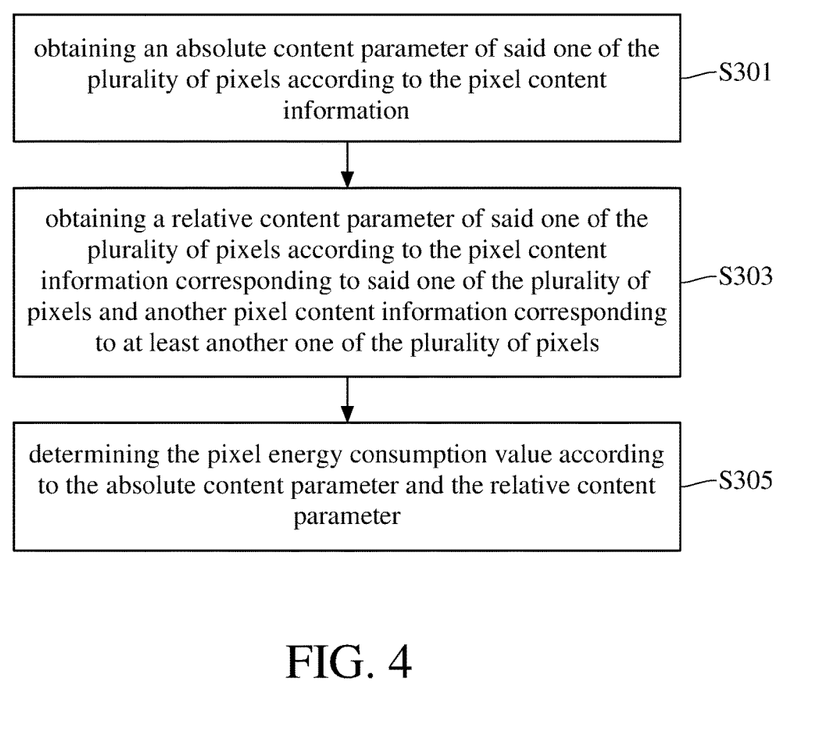
FIG. 4 is a flow chart of a power consumption estimation method according to an embodiment of the disclosure.

In practice, in the embodiment as shown in FIG. 4, the type of the subject pixel is determined according to its absolute content parameter and relative content parameter, and the pixel energy consumption value of the subject pixel is obtained from a lookup table according to the type of the subject pixel. The lookup table comprises a plurality of elements and each of the plurality of elements indicates the pixel energy consumption value corresponding to one of a plurality of pixel types, and the lookup table could be one-dimensional or multi-dimensional. This disclosure does not intent to limit it.

In an embodiment, the absolute content parameter is a brightness value, and the relative content parameter is a gradient value indicating the gradient between the subject pixel and another one of the plurality of pixels. In practice, the gradient value is obtained by the gradient operation of the brightness values of the subject pixel and said another one of the plurality of pixels. For example, the gradient operation is performed by applying the Sobel operator to the image for mask operation, but is not limited to it. A person having ordinary skills in the art could define the appropriate definition of the gradient, the related operator or the operational mask according to actual requirements. For example, in the embodiment in which the gradient value is obtained by the Sobel operator, a horizontal gradient value and a vertical gradient value are calculated by two matrices which are defined by the Sobel operator, and the gradient value and a gradient direction are calculated by the horizontal gradient value and the vertical gradient value. Therefore, in the aforementioned step S305, the type of the subject pixel could be determined according to the brightness value and the gradient value of the subject pixel. In another practice, the type of the subject pixel could be determined according to the brightness value, the horizontal gradient value and the vertical gradient value of the subject pixel. In other words, the relative content parameter could comprise the horizontal gradient value and the vertical gradient value. In an embodiment, the pixels having the same brightness value and the same gradient value but respectively belonging to different images are classified the same type. In other words, the type of a pixel could be determined according to its brightness value and gradient value.

In an embodiment, when the type of a pixel is determined, the pixel energy consumption value of this pixel could be obtained from a lookup table according to the type of this pixel. The lookup table comprises a plurality of elements and each of the plurality of elements indicates the pixel energy consumption value corresponding to one of the plurality of pixel types. In practice, the brightness value as well as the gradient value of a subject pixel could be converted into an address, and according to this address, the element stored in the location with this address in the lookup table is considered to be the pixel energy consumption value of the subject pixel. In practice, the brightness value and gradient value of the pixel could be appropriately quantized so as to reduce operational complexity and the data quantity of the lookup table.

Figure 5:
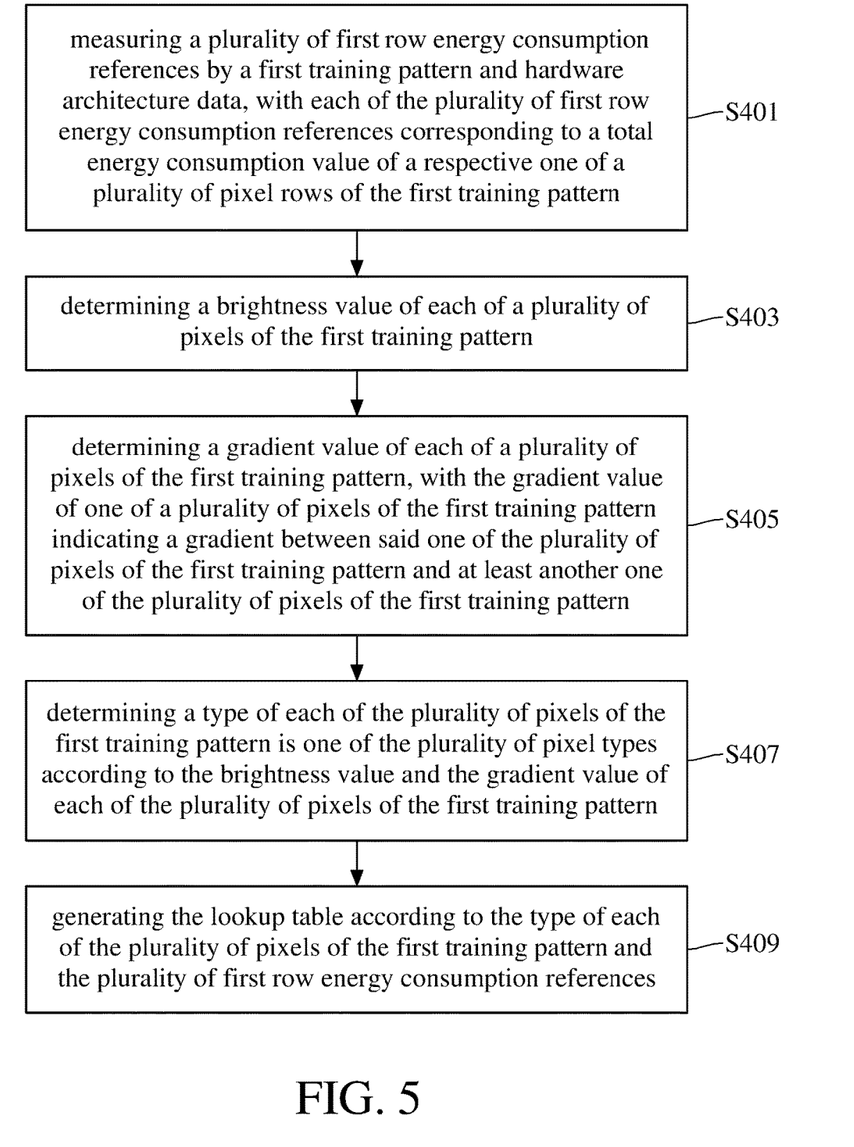
FIG. 5 is a flow chart of a power consumption estimation method according to another embodiment of the disclosure.

Please refer to FIG. 5 which is a flow chart of a power consumption estimation method according to another embodiment of the disclosure. In step S401, a plurality of first row energy consumption references is measured by a first training pattern and hardware architecture data. Each of the plurality of first row energy consumption references corresponds to the total energy consumption value of one of a plurality of pixel rows of the first training pattern. In practice, in step S401, the first row energy consumption references could be obtained by measuring a first training pattern via the hardware of an image associated processor and a measuring apparatus, or the first row energy consumption references could be estimated by measuring a first training pattern by an estimation software and an image associated processor which is constructed by hardware description language. In step S403, the brightness value of each of the pixels of the first training pattern is determined. In step S405, the gradient value of each of the pixels of the first training pattern is determined wherein the gradient value of one of the pixels indicates the gradient between said one of the pixels and at least another one of the pixels. In step S407, the type of each of the pixels of the first training pattern is determined according to its brightness value and gradient value. In step S409, the lookup table is generated according to the type of each pixel of the first training pattern and the plurality of first row energy consumption references.

In an embodiment, a matrix E could be formed according to the plurality of first row energy consumption references, and when the type of each pixel of the first training pattern is determined, another matrix A could be formed according to the count result indicating that each row of the first training pattern includes pixels with which pixel types. The size of the matrix E is h×1 and that of the matrix A is h×k wherein h is the number of the rows of the first training pattern and k is the number of the pixel types. In other words, each of the elements of the matrix E indicates the first row energy consumption reference corresponding to a respective one of the rows of the first training pattern, and each of the elements of the matrix A indicates the number of pixels with a specific one of pixel types in a specific one of row of the first training pattern. After the matrices A and E are obtained, another matrix W is then obtained by solving a conditional arg min$\|A \cdot W - E\|^2$ subject to $W \geq 0$ through the least square method. The size of the matrix W is k×1 and each of the elements of the matrix W indicates the energy consumption value of a respective one of the pixel types. In other words, the matrix W is the aforementioned lookup table.

In practice, the lookup table is obtained according to the first training pattern, and could be further updated according to other one or more training patterns. Please refer to FIG. 6 which is a flow chart of a power consumption estimation method according to yet another embodiment of the disclosure. In step S501, a plurality of second row energy consumption references are measured by a second training pattern and the hardware architecture data. In step S503, the brightness value of each of the pixels of the second training pattern is determined. In step S505, the gradient value of each of the pixels of the second training pattern is determined wherein the gradient value of one of the pixels indicates the gradient between said one and at least another one of the pixels of the second training pattern. In step S507, the type of each of the pixels of the second training pattern is determined according to its brightness value and gradient value. Pixels of different types should be different in the brightness value or in the gradient value. In step S509, the lookup table is updated according to the type of each pixel of the second training pattern, the plurality of second row energy consumption references and a constraint condition.

Figure 6:
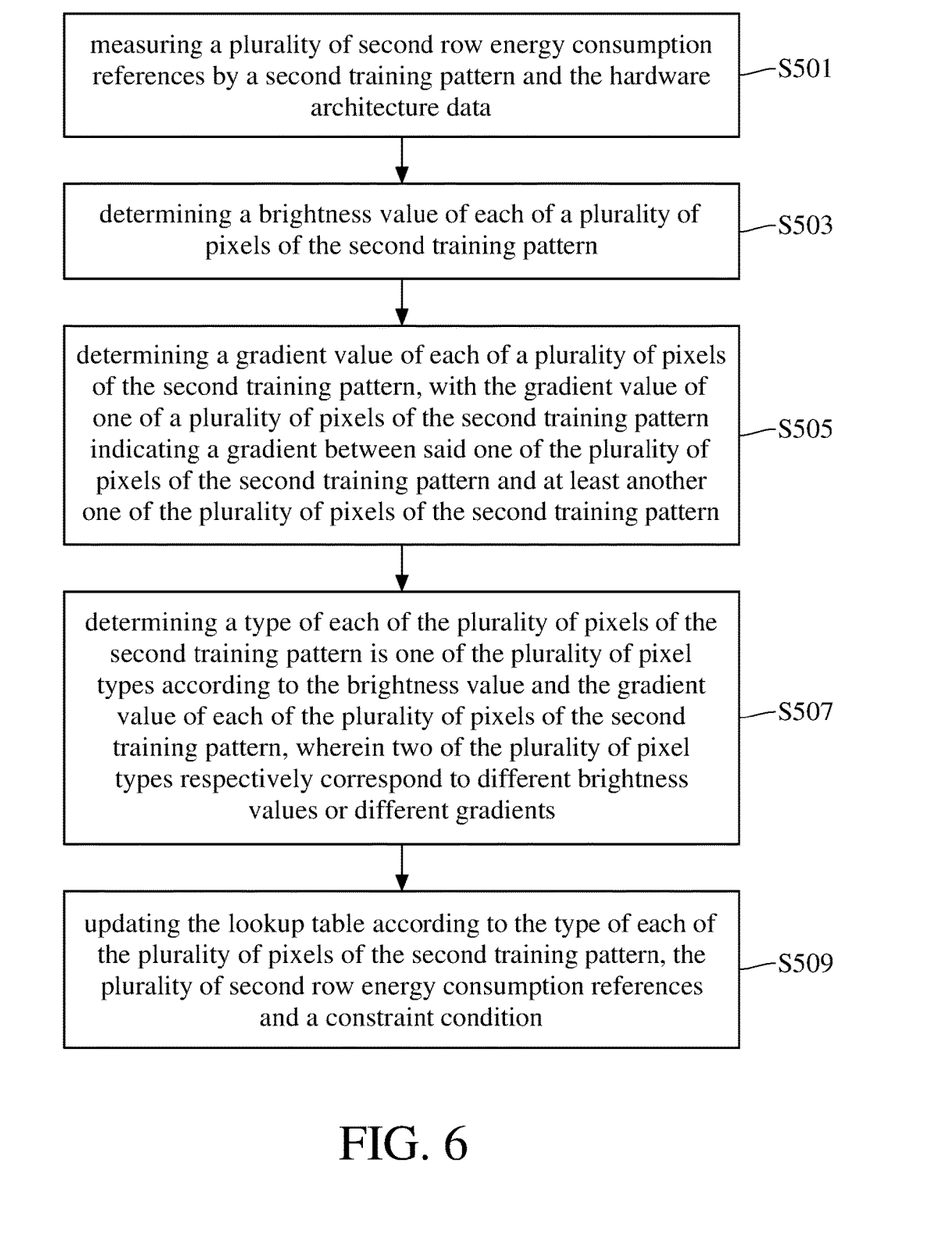
FIG. 6 is a flow chart of a power consumption estimation method according to yet another embodiment of the disclosure.

Any two of the pixel types are respectively defined as the first type and the second type. The constraint condition indicates that the gradient value corresponding to the first type is larger than the gradient value corresponding to the second type, the brightness value corresponding to the first type is equal to the brightness value corresponding to the second type, and the energy consumption value of the first type is larger than the energy consumption value of the second type. Therefore, the calculation result which fits the aforementioned conditional but slightly deviates from the reality may be avoided. In practice, there are a number of the second training patterns; that is, the lookup table may more conform to the operation of the hardware by being updated many times. In an embodiment, the aforementioned training patterns could be predetermined; that is, the process of updating the lookup table could be performed offline.

Figure 7:
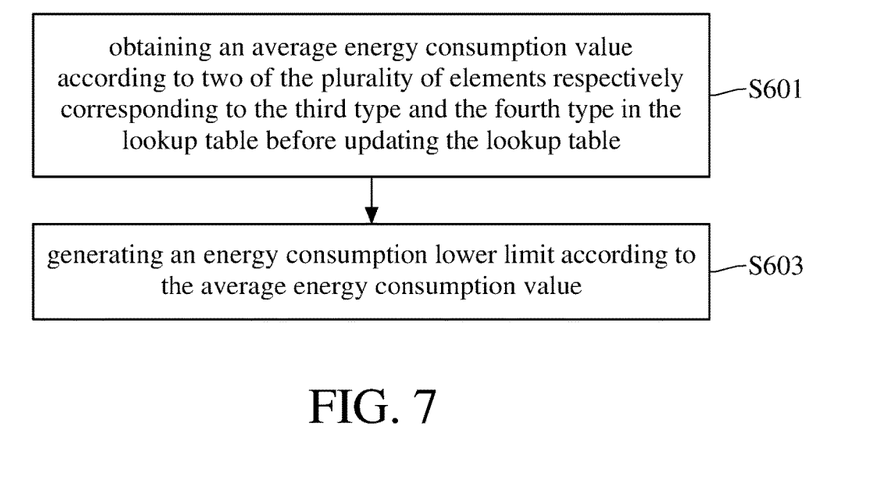
FIG. 7 is a flow chart of a power consumption estimation method according to yet another embodiment of the disclosure.

In practice, the constraint condition could be carried out in the power consumption estimation method by various methods. Please refer to FIG. 7 which is a flow chart of a power consumption estimation method according to yet another embodiment of the disclosure. In the embodiment as shown in FIG. 7, any three of the pixel types are defined as the third type, the fourth type and the fifth type. All of the brightness values corresponding to the third type, the fourth type and the fifth type are identical. The gradient value corresponding to the third type is less than the gradient value corresponding to the fourth type. The gradient value corresponding to the fourth type is less than the gradient value corresponding to the fifth type. In step S601, the average energy consumption value is obtained according to the elements respectively corresponding to the third type and the fourth type in the lookup table before updating the lookup table. In step S603, an energy consumption lower limit corresponding to the fifth type is generated according to the average energy consumption value. In the embodiment as shown in FIG. 7, the constraint condition further comprises that the value of the element corresponding to the fifth type in the updated lookup table is not less than the energy consumption lower limit.

Figure 8:
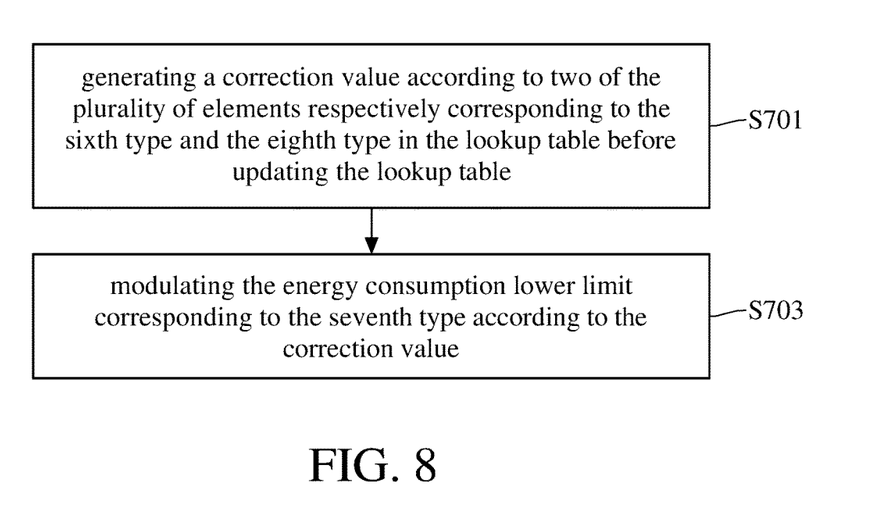
FIG. 8 is a flow chart of a power consumption estimation method according to yet another embodiment of the disclosure.

Please refer to FIG. 8 which is a flow chart of a power consumption estimation method according to yet another embodiment of the disclosure. In the embodiment as shown in FIG. 8, any three of the pixel types are defined as the sixth type, the seventh type and the eighth type. The brightness value corresponding to the sixth type is larger than the brightness value corresponding to the seventh type. The brightness value corresponding to the seventh type is larger than the brightness value corresponding to the eighth type. All of gradient values respectively corresponding to the sixth type, the seventh type and the eighth type are identical. In step S701, a correction value is generated according to the elements corresponding to the sixth type and the eighth type in the lookup table which is not updated. In step S703, the energy consumption lower limit corresponding to the seventh type is modulated according to the correction value. A person having ordinary skills in the art may have ability to design the method for generating a correction value based on the actual requirements after reading the specification of the disclosure. Methods involved in generating a correction method according to the relationships of the brightness value and the gradient values between various types of pixels as aforementioned are in the scope of the disclosure. In an embodiment, the correction value is added to the energy consumption lower limit to obtain the updated energy consumption lower limit. In another embodiment, the energy consumption lower limit is multiplied by a ratio parameter to obtain a calculation result and the correction value is multiplied by another ratio parameter to obtain another calculation result, and then these two calculation results are added together to obtain the updated energy consumption lower limit. When the ratio parameter corresponding to the energy consumption lower limit is less than one and is a positive number, the ratio parameter corresponding to the correction value could be set as the value resulted from subtracting the ratio parameter corresponding to the energy consumption lower limit from one.

Figure 9:
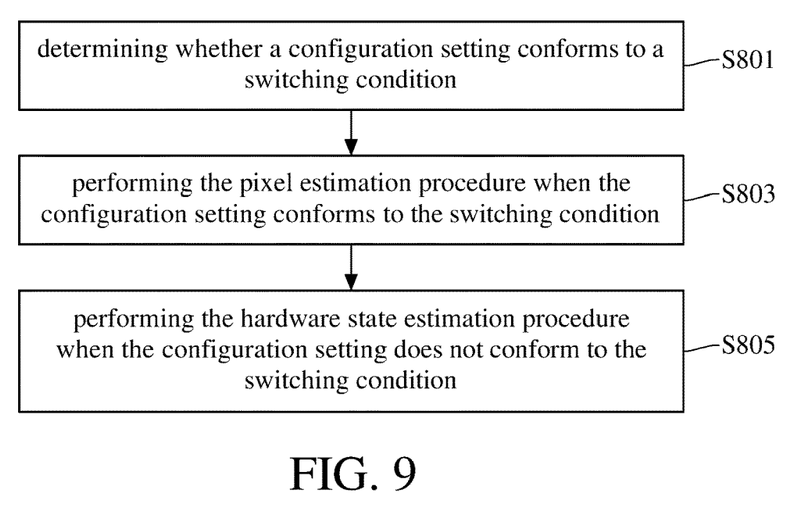
FIG. 9 is a flow chart of a power consumption estimation method according to yet another embodiment of the disclosure.
Figure 10:
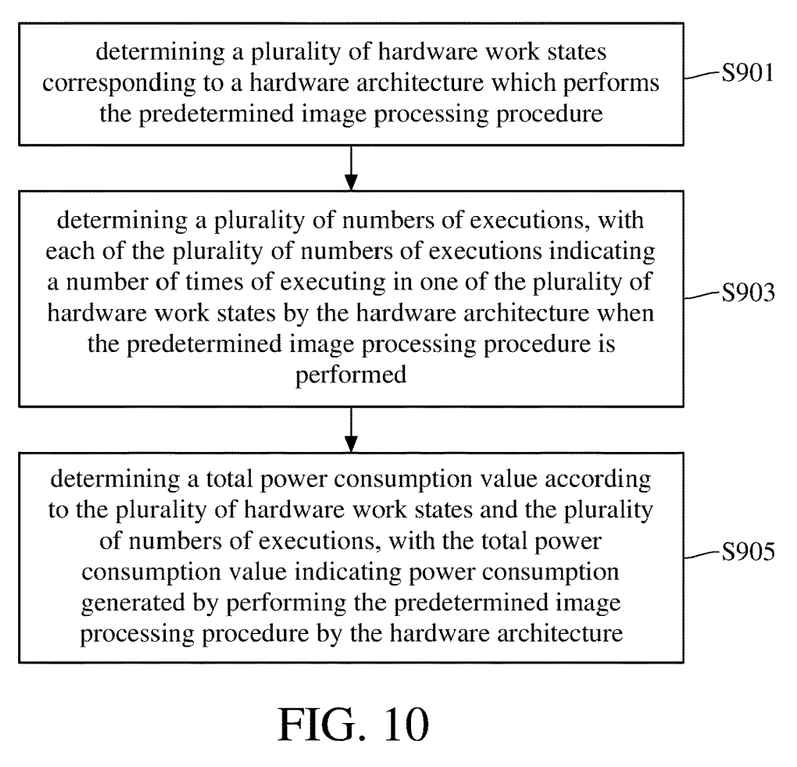
FIG. 10 is a flow chart of a power consumption estimation method according to yet another embodiment of the disclosure.

In another embodiment, besides the pixel estimation procedure as aforementioned, the power consumption estimation method provided in this disclosure further comprises a hardware state estimation procedure. Please refer to FIG. 9 and FIG. 10. FIG. 9 is a flow chart of a power consumption estimation method according to yet another embodiment of the disclosure, and FIG. 10 is a flow chart of a power consumption estimation method according to yet another embodiment of the disclosure. In step S801, the configuration setting is determined whether to conform to a switching condition. In step S803, when the configuration setting is determined that it conforms to the switching condition, the pixel estimation procedure is performed. In step S805, when the configuration setting is determined that is does not conform to the switching condition, the hardware state estimation procedure is performed. For example, the switching condition is that a variable or the value stored in a memory field is changed, and the unnecessary details are not described herein.

On the other hand, in step S901 of the hardware state estimation procedure, a plurality of hardware work states corresponding to performing the predetermined image processing by hardware architecture is determined. In step S903, the numbers of executions are determined wherein each of the numbers of executions indicates the number of times of executing in one of the plurality of hardware work state when the hardware architecture performs the predetermined image processing procedure. In step S905, the total power consumption value is determined according to the power consumption values of the plurality of hardware work states and the numbers of executions, wherein the total power consumption indicates the total power consumption generated when the hardware architecture performs the predetermined image processing procedure.

Figure 11:
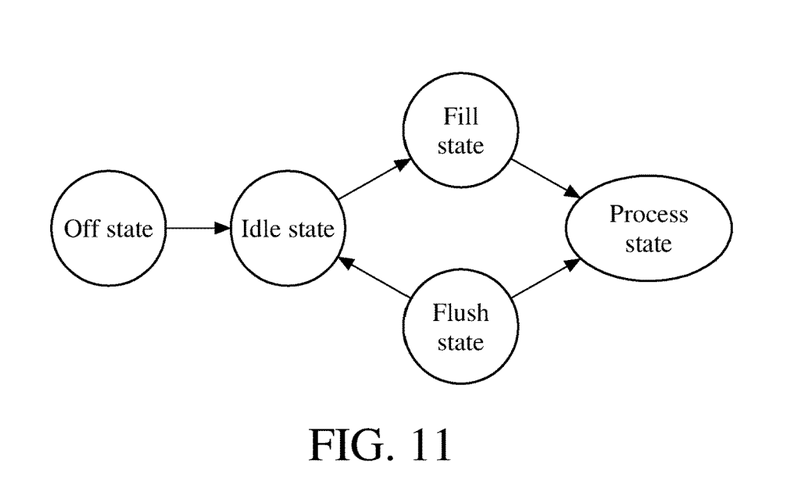
FIG. 11 is a schematic diagram of state conversion of hardware according to an embodiment of the disclosure.

Please refer to FIG. 11 for the further description of the hardware state estimation procedure. FIG. 11 is a schematic diagram of state conversion of hardware according to an embodiment of the disclosure. In practice, when the hardware architecture performs the aforementioned predetermined image processing procedure, the hardware architecture mainly switches among the idle state, fill state, process state and flush state. Therefore, in the hardware state estimation procedure, the total power consumption value which indicates the total power consumption generated by the hardware architecture during the predetermined image processing procedure is determined according to the power consumption generated during each hardware state of the hardware architecture and the number of execution of each hardware state by the hardware architecture during the predetermined image processing procedure. For example, in an embodiment, the total power consumption value is obtained by accumulating the product of the number of execution and the power consumption value corresponding to each hardware state. This power consumption estimation method may obtain the power consumption value in relation to various aspects by switching between the pixel estimation procedure and the hardware state estimation procedure, and may select the appropriate estimation procedure to estimate the power consumption according to the computing resources which is currently available.

Figure 12:
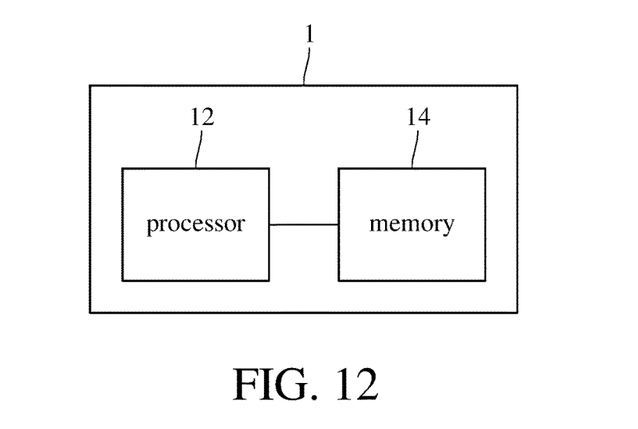
FIG. 12 is a functional block diagram of a power consumption estimation apparatus according to an embodiment of the disclosure.

As set forth above, this disclosure provides various power consumption estimation apparatuses. Please refer to FIG. 12 which is a functional block diagram of a power consumption estimation apparatus according to an embodiment of the disclosure. In the embodiment as shown in FIG. 12, a power consumption estimation apparatus 1 comprises a processor 12 and a memory 14. The processor 12 is electrically connected to the memory 14. The memory 14 is configured to store a plurality of instructions. The processor 12 is configured to perform one or more instructions stored in the memory 14. When the processor 12 performs one or more instructions, the power consumption estimation apparatus 1 is configured to perform any one of the power consumption estimation methods described in the above embodiments. The processor 12 is, for example, a central procedure unit (CPU) or a digital signal processor (DSP). The memory 14 could be a volatile memory or a non-volatile memory. Moreover, the processor 12 and the memory 14 could be integrated into a micro control unit (MCU). The above description is merely exemplified and this disclosure is not limited to it.

Figure 13:
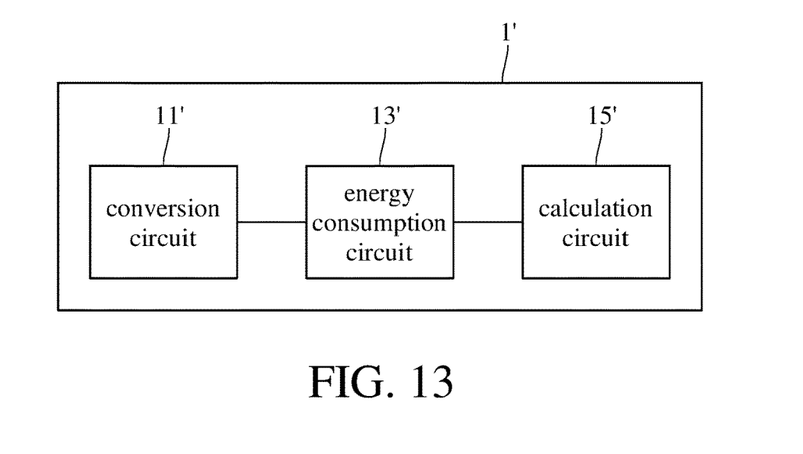
FIG. 13 is a functional block diagram of a power consumption estimation apparatus according to another embodiment of the disclosure.

According to the above description, this disclosure also provides another kind of power consumption estimation apparatus. Please refer to FIG. 13 which is a functional block diagram of a power consumption estimation apparatus according to another embodiment of the disclosure. In the embodiment as shown in FIG. 13, a power consumption estimation apparatus 1' comprises a conversion circuit 11', an energy consumption estimation circuit 13' and a calculation circuit 15'. The energy consumption estimation circuit 13' is electrically connected to the conversion circuit 11' and the calculation circuit 15' is electrically connected to the energy consumption estimation circuit 13'.

The conversion circuit 11' is configured to obtain a retrieval signal according to pixel content information. The retrieval signal is configured to indicate the type of a current operating pixel. The current operating pixel is one of pixels of an image. These pixels are arranged in N rows. Each of the N rows comprises a number of pixels. For calculating a row power consumption value, the pixels in one row of the N rows serve as the current operating pixel sequentially. Thus, the energy consumption estimation circuit 13' is configured to provide a pixel energy consumption value corresponding to the current operating pixel according to the retrieval signal. The calculation circuit 15' is configured to accumulate the pixel energy consumption values of the pixels in the same row provided by the energy consumption estimation circuit 13', and to obtain a row power consumption value of the row For example, the conversion circuit 11', the energy consumption estimation circuit 13' and the calculation circuit 15' are integrated into a field programmable gate array (FPGA) or an integrated circuit (IC). The specific operation of the conversion circuit 11', the energy consumption estimation circuit 13' and the calculation circuit 15' is similar to the aforementioned power consumption estimation method. Therefore, herein, merely the structure of the power consumption estimation apparatus is explained, and its operation details are not repeated.

Figure 14:
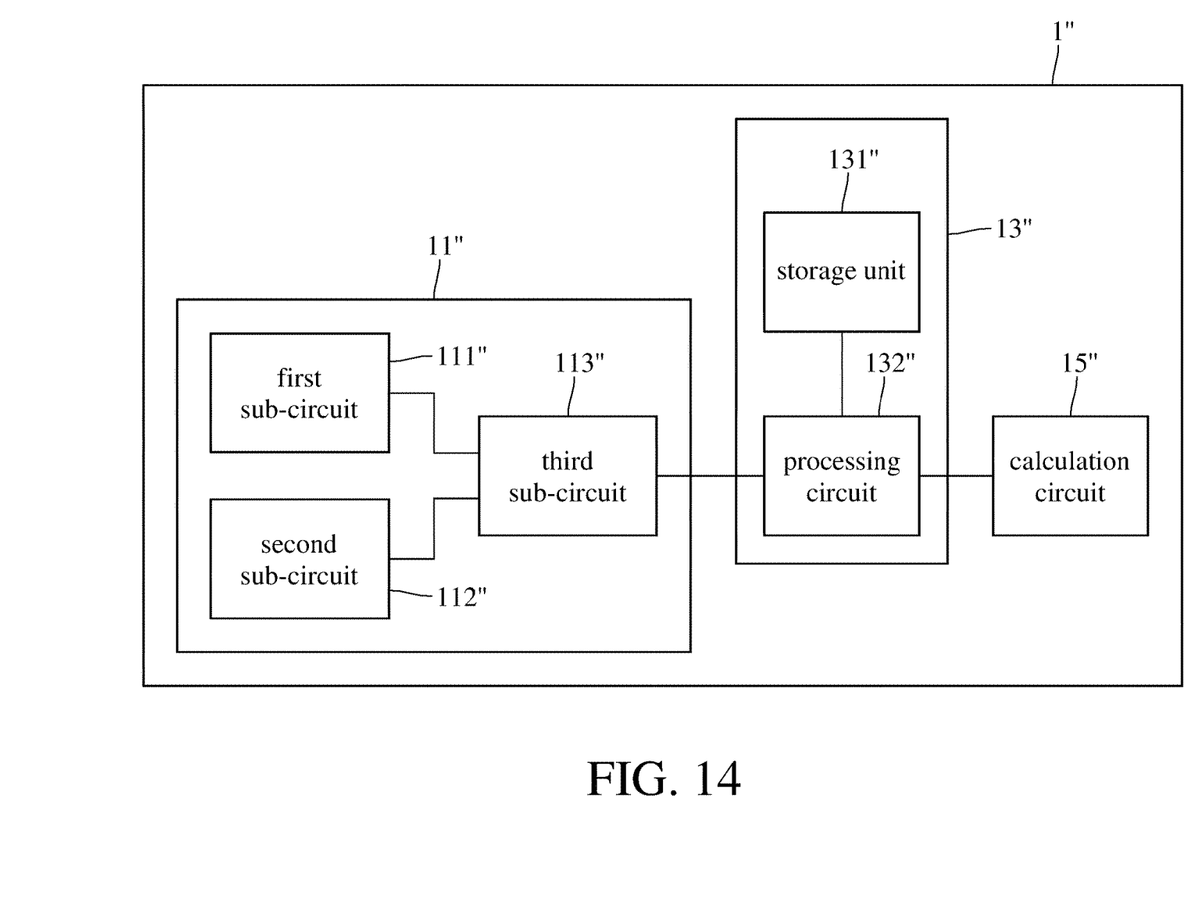
FIG. 14 is a functional block diagram of a power consumption estimation apparatus according to yet another embodiment of the disclosure.

Please refer to FIG. 13 and FIG. 14. FIG. 14 is a functional block diagram of a power consumption estimation apparatus according to yet another embodiment of the disclosure. The circuit structure of a conversion circuit 11" as shown in FIG. 14 is approximately similar to the circuit structure of the conversion circuit 11' as shown in FIG. 13, but the conversion circuit 11" further comprises a first sub-circuit 111", a second sub-circuit 112" and a third sub-circuit 113". The third sub-circuit 113" is respectively and electrically connected to the first sub-circuit 111" and the second sub-circuit 112". Furthermore, the third sub-circuit 113" is also electrically connected to the energy consumption estimation circuit 13". The first sub-circuit 111" is configured to obtain the absolute content parameter of the current operating pixel according to the pixel content information. The second sub-circuit 112" is configured to obtain the relative content parameter according to the pixel content information corresponding to the current operating pixel and another pixel content information corresponding to at least another one of pixels. The third sub-circuit 113" is configured to generate the retrieval signal according to the absolute content parameter and the relative content parameter.

On the other hand, in the embodiment as shown in FIG. 14, the energy consumption estimation circuit 13" further comprises a storage unit 131" and a processing circuit 132". The storage unit 131" is electrically connected to the processing circuit 132". The storage unit 131" is configured to store the lookup table as aforementioned. The processing circuit 132" obtains the pixel energy consumption value of the current operating pixel from the lookup table according to the retrieval signal. In an embodiment, the processing circuit 132" is further configured to generate or update the lookup table as aforementioned. For example, the storage unit 131" is a volatile memory or a non-volatile memory.

In view of the above description, this disclosure provides a power consumption estimation method and a power consumption estimation apparatus. The power consumption estimation method and the power consumption estimation apparatus may be configured to estimate the power consumption generated when the image processing circuit with any kind of hardware configuration processes a subject image, according to the content of the subject image. In other words, a power consumption model for the associated hardware configuration may be provided. The power consumption model may indicate the average power consumption value generated by each row of pixels of the subject when a predetermined image processing procedure is performed for the subject image.

What is claimed is:

1. A power consumption estimation method, applied to an image with N rows of pixels, and comprising a pixel estimation procedure, with the pixel estimation procedure comprising:

performing an estimation sub-procedure pixel by pixel for each of a plurality of pixels in one row of the N rows of pixels so as to obtain a plurality of pixel energy consumption values respectively corresponding to the plurality of pixels in said one row of the N rows of pixels; and obtaining a row power consumption value corresponding to said one row of the N rows of pixels according to the plurality of pixel energy consumption values;

wherein the estimation sub-procedure comprises:

obtaining pixel content information corresponding to one of the plurality of pixels; and determining the pixel energy consumption value according to the pixel content information, with the pixel energy consumption value indicating pixel energy consumption generated by performing a predetermined image processing procedure for said one of the plurality of pixels.

2. The power consumption estimation method according to claim 1, wherein determining the pixel energy consumption value according to the pixel content information comprises:

obtaining an absolute content parameter of said one of the plurality of pixels according to the pixel content information;

obtaining a relative content parameter of said one of the plurality of pixels according to the pixel content information corresponding to said one of the plurality of pixels and another pixel content information corresponding to at least another one of the plurality of pixels; and determining the pixel energy consumption value according to the absolute content parameter and the relative content parameter.

3. The power consumption estimation method according to claim 2, wherein determining the pixel energy consumption value according to the pixel content information is performed by determining a type of said one of the plurality of pixels is one of a plurality of pixel types according to the absolute content parameter and the relative content parameter thereof corresponding to the pixel content information, and obtaining the pixel energy consumption value of said one of the plurality of pixels from a lookup table according to the type of said one of the plurality of pixels;

wherein the lookup table comprises a plurality of elements, with each of the plurality of elements indicating a pixel energy consumption value corresponding to a respective one of the plurality of pixel types.

4. The power consumption estimation method according to claim 3, wherein the absolute content parameter of said one of the plurality of pixels is considered a brightness value of said one of the plurality of pixels, the relative content parameter of said one of the plurality of pixels is considered a gradient value of said one of the plurality of pixels indicating a gradient between said one of the plurality of pixels and at least another one of the plurality of pixels, and determining the pixel energy consumption value according to the absolute content parameter and the relative content parameter is performed by determining the type of said one of the plurality of pixels according to the brightness value and the gradient value of said one of the plurality of pixels.

5. The power consumption estimation method according to claim 4, wherein the pixel estimation procedure further comprises:
   measuring a plurality of first row energy consumption references by a first training pattern and hardware architecture data, with each of the plurality of first row energy consumption references corresponding to a total energy consumption value of a respective one of a plurality of pixel rows of the first training pattern;
   determining a brightness value of each of a plurality of pixels of the first training pattern;
   determining a gradient value of each of a plurality of pixels of the first training pattern, with the gradient value of one of a plurality of pixels of the first training pattern indicating a gradient between said one of the plurality of pixels of the first training pattern and at least another one of the plurality of pixels of the first training pattern;
   determining a type of each of the plurality of pixels of the first training pattern is one of the plurality of pixel types according to the brightness value and the gradient value of each of the plurality of pixels of the first training pattern; and
   generating the lookup table according to the type of each of the plurality of pixels of the first training pattern and the plurality of first row energy consumption references.

6. The power consumption estimation method according to claim 5, wherein the pixel estimation procedure further comprises:
   measuring a plurality of second row energy consumption references by a second training pattern and the hardware architecture data;
   determining a brightness value of each of a plurality of pixels of the second training pattern;
   determining a gradient value of each of a plurality of pixels of the second training pattern, with the gradient value of one of a plurality of pixels of the second training pattern indicating a gradient between said one of the plurality of pixels of the second training pattern and at least another one of the plurality of pixels of the second training pattern;
   determining a type of each of the plurality of pixels of the second training pattern is one of the plurality of pixel types according to the brightness value and the gradient value of each of the plurality of pixels of the second training pattern, wherein any two of the plurality of pixel types respectively correspond to different brightness values or different gradients; and
   updating the lookup table to form an updated table according to the type of each of the plurality of pixels of the second training pattern, the plurality of second row energy consumption references and a constraint condition;
   wherein two of the plurality of pixel types are respectively defined as a first type and a second type, and the constraint condition indicates that a gradient value corresponding to the first type is larger than a gradient value corresponding to the second type, a brightness value corresponding to the first type is equal to a brightness value corresponding to the second type, and an energy consumption value of the first type is larger than an energy consumption value of the second type.

7. The power consumption estimation method according to claim 6, wherein three of the plurality of pixel types are respectively defined as a third type, a fourth type and a fifth type, all of brightness values respectively corresponding to the third type, the fourth type and the fifth type are identical, a gradient value corresponding to the third type is less than a gradient value corresponding to the fourth type, the gradient value corresponding to the fourth type is less than a gradient value corresponding to the fifth type, and the method further comprises:
   obtaining an average energy consumption value according to two of the plurality of elements respectively corresponding to the third type and the fourth type in the lookup table before updating the lookup table; and
   generating an energy consumption lower limit corresponding to the fifth type according to the average energy consumption value;
   wherein the constraint condition further indicates that a value of another one of the plurality of elements corresponding to the fifth type in the updated lookup table is not less than the energy consumption lower limit.

8. The power consumption estimation method according to claim 7, wherein three of the plurality of pixel types are respectively defined as a sixth type, a seventh type and a eighth type, a brightness value corresponding to the sixth type is larger than a brightness value corresponding to the seventh type, the brightness value corresponding to the seventh type is larger than a brightness value corresponding to the eighth type, all of gradient values respectively corresponding to the sixth type, the seventh type and the eighth type are identical, and the method further comprises:
   generating a correction value according to two of the plurality of elements respectively corresponding to the sixth type and the eighth type in the lookup table before updating the lookup table;
   modulating the energy consumption lower limit corresponding to the seventh type according to the correction value.

9. A power consumption estimation apparatus, comprising:
   a memory configured to store a plurality of instructions; and
   a processor electrically connected to the memory and configured to perform one or more of the plurality of instructions;
   wherein when the processor performs said one or more of the plurality of instructions, the power consumption estimation apparatus is configured to perform the power consumption estimation method according to claim 8.

10. A power consumption estimation apparatus, comprising:
    a memory configured to store a plurality of instructions; and
    a processor electrically connected to the memory and configured to perform one or more of the plurality of instructions;
    wherein when the processor performs said one or more of the plurality of instructions, the power consumption estimation apparatus is configured to perform the power consumption estimation method according to claim 6.

11. A power consumption estimation apparatus, comprising:
    a memory configured to store a plurality of instructions; and a processor electrically connected to the memory and configured to perform one or more of the plurality of instructions;

wherein when the processor performs said one or more of the plurality of instructions, the power consumption estimation apparatus is configured to perform the power consumption estimation method according to claim 7.

12. A power consumption estimation apparatus, comprising:
a memory configured to store a plurality of instructions; and
a processor electrically connected to the memory and configured to perform one or more of the plurality of instructions;
wherein when the processor performs said one or more of the plurality of instructions, the power consumption estimation apparatus is configured to perform the power consumption estimation method according to claim 5.

13. A power consumption estimation apparatus, comprising:
a memory configured to store a plurality of instructions; and
a processor electrically connected to the memory and configured to perform one or more of the plurality of instructions;
wherein when the processor performs said one or more of the plurality of instructions, the power consumption estimation apparatus is configured to perform the power consumption estimation method according to claim 4.

14. The power consumption estimation method according to claim 3, wherein the absolute content parameter of said one of the plurality of pixels indicates a brightness value of said one of the plurality of pixels, the relative content parameter of said one of the plurality of pixels comprises a horizontal gradient value indicating a horizontal gradient between said one of the plurality of pixels and at least another one of the plurality of pixels and a vertical gradient value indicating a vertical gradient between said one of the plurality of pixels and at least another one of the plurality of pixels, and determining the pixel energy consumption value according to the absolute content parameter and the relative content parameter is performed by determining the type of said one of the plurality of pixels according to the brightness value, the horizontal gradient value and the vertical gradient value of said one of the plurality of pixels.

15. A power consumption estimation apparatus, comprising:
a memory configured to store a plurality of instructions; and
a processor electrically connected to the memory and configured to perform one or more of the plurality of instructions;
wherein when the processor performs said one or more of the plurality of instructions, the power consumption estimation apparatus is configured to perform the power consumption estimation method according to claim 14.

16. A power consumption estimation apparatus, comprising:
a memory configured to store a plurality of instructions; and
a processor electrically connected to the memory and configured to perform one or more of the plurality of instructions;

wherein when the processor performs said one or more of the plurality of instructions, the power consumption estimation apparatus is configured to perform the power consumption estimation method according to claim 3.

17. A power consumption estimation apparatus, comprising:
a memory configured to store a plurality of instructions; and
a processor electrically connected to the memory and configured to perform one or more of the plurality of instructions;
wherein when the processor performs said one or more of the plurality of instructions, the power consumption estimation apparatus is configured to perform the power consumption estimation method according to claim 2.

18. The power consumption estimation method according to claim 1, further comprising a hardware state estimation procedure and further comprising:
determining whether a configuration setting conforms to a switching condition;
performing the pixel estimation procedure when the configuration setting conforms to the switching condition; and
performing the hardware state estimation procedure when the configuration setting does not conform to the switching condition;
wherein the hardware state estimation procedure comprises:
determining a plurality of hardware work states corresponding to hardware architecture which performs the predetermined image processing procedure;
determining a plurality of numbers of executions, with each of the plurality of numbers of executions indicating a number of times of executing in one of the plurality of hardware work state by the hardware architecture when the predetermined image processing procedure is performed; and
determining a total power consumption value according to the plurality of hardware work states and the plurality of numbers of executions, with the total power consumption value indicating power consumption generated by performing the predetermined image processing procedure by the hardware architecture.

19. A power consumption estimation apparatus, comprising:
a memory configured to store a plurality of instructions; and
a processor electrically connected to the memory and configured to perform one or more of the plurality of instructions;
wherein when the processor performs said one or more of the plurality of instructions, the power consumption estimation apparatus is configured to perform the power consumption estimation method according to claim 1.

20. A power consumption estimation apparatus, comprising:
a conversion circuit configured to obtain a retrieval signal according to pixel content information, with the retrieval signal configured to indicate a type of a current operating pixel, wherein the current operating pixel is considered one of a plurality of pixels of an image, and the plurality of pixels are arranged in N rows;

an energy consumption estimation circuit electrically connected to the conversion circuit, and configured to provide a pixel energy consumption value corresponding to the current operating pixel according to the retrieval signal; and
a calculation circuit electrically connected to the energy consumption estimation circuit, and configured to accumulate the pixel energy consumption value provided by the energy consumption estimation circuit to obtain a row power consumption value of one of the N rows which comprising the current operating pixel.

21. The power consumption estimation apparatus according to claim 20, wherein the conversion circuit comprises:
a first sub-circuit configured to obtain an absolute content parameter of the current operating pixel according to the pixel content information;
a second sub-circuit configured to obtain a relative content parameter according to the pixel content information corresponding to the current operating pixel and another pixel content information corresponding to at least another one of the plurality of pixels;
a third sub-circuit electrically connected to the first sub-circuit, the second sub-circuit and the energy consumption estimation circuit, and configured to generate the retrieval signal according to the absolute content parameter and the relative content parameter.

22. The power consumption estimation apparatus according to claim 21, wherein the energy consumption estimation circuit further comprises a storage unit and a processing circuit, the storage unit is configured to store a lookup table, and the processing circuit obtains the pixel energy consumption value of the current operating pixel from the lookup table according to the retrieval signal.

* * * * *